US007833091B2

(12) United States Patent
Holtmann et al.

(10) Patent No.: US 7,833,091 B2
(45) Date of Patent: Nov. 16, 2010

(54) COMBINE HARVESTER CLEAN CROP ELEVATOR

(75) Inventors: Bernd Holtmann, Sendenhorst (DE); Stefan Teroerde, Warendor (DE); Winfried Wesselmann, Warendorf (DE); Ingo Boenig, Guetersloh (DE); Christopher Vieregge, Doerentrup (DE); Daniel Brueggemann, Herzebrock (DE); Hubert Korte, Ostbevern (DE); Ulrich Claes, Dissen (DE); Waldemar Schulz, Paderborn (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 12/436,473

(22) Filed: May 6, 2009

(65) Prior Publication Data

US 2009/0280877 A1   Nov. 12, 2009

(30) Foreign Application Priority Data

May 9, 2008   (DE) .................... 10 2008 023 005

(51) Int. Cl.
*A01F 12/60* (2006.01)
(52) U.S. Cl. ........................ 460/119; 460/114
(58) Field of Classification Search .............. 460/114, 460/119, 13, 14; 414/526, 812; 198/668, 198/666
See application file for complete search history.

(56) References Cited

U.S. PATENT DOCUMENTS

| | | | | |
|---|---|---|---|---|
| 1,382,901 A * | 6/1921 | Gebhardt | .................... | 209/321 |
| 3,580,257 A * | 5/1971 | Teague | ....................... | 460/102 |
| 3,760,813 A * | 9/1973 | Mathews | ..................... | 460/119 |
| 4,800,902 A * | 1/1989 | Maust | ......................... | 460/59 |
| 5,318,475 A * | 6/1994 | Schrock et al. | ................. | 460/1 |
| 5,380,247 A * | 1/1995 | Underwood | ................. | 460/114 |
| 5,443,352 A * | 8/1995 | Schuhmacher | ............. | 414/526 |
| 5,496,215 A * | 3/1996 | Underwood et al. | ........ | 460/114 |
| 5,498,206 A * | 3/1996 | Underwood et al. | .......... | 460/14 |
| 5,863,247 A * | 1/1999 | Behnke et al. | ................. | 460/6 |
| 6,102,795 A * | 8/2000 | Behrens | ..................... | 460/119 |
| 6,142,290 A * | 11/2000 | Tagliaferri | .................. | 198/716 |
| 6,350,197 B1 | 2/2002 | Cooksey et al. | | |
| 6,669,558 B1 * | 12/2003 | Wolters et al. | ............... | 460/14 |
| 6,974,384 B2 * | 12/2005 | Schmidt | ..................... | 460/114 |
| 2009/0270147 A1 * | 10/2009 | Becker et al. | ............... | 460/114 |

* cited by examiner

*Primary Examiner*—Árpád Fábián-Kovács
(74) *Attorney, Agent, or Firm*—Michael J. Striker

(57) ABSTRACT

A combine harvester has at least one cleaning device which includes at least one sieve and one cleaning fan, at least one conveyor device for conveying at least a portion of the crop material that exits the cleaning device into a higher region of the combine harvester and including at least one elevator having a lower intake region and an upper transfer region, the crop material being conveyed in the elevator via conveyor plates which are situated on a circulating chain, and the elevator includes, in its lower region, at least two interspaced deflection axles for the circulating chain, which are oriented transversely to the longitudinal extension of the combine harvester.

12 Claims, 7 Drawing Sheets

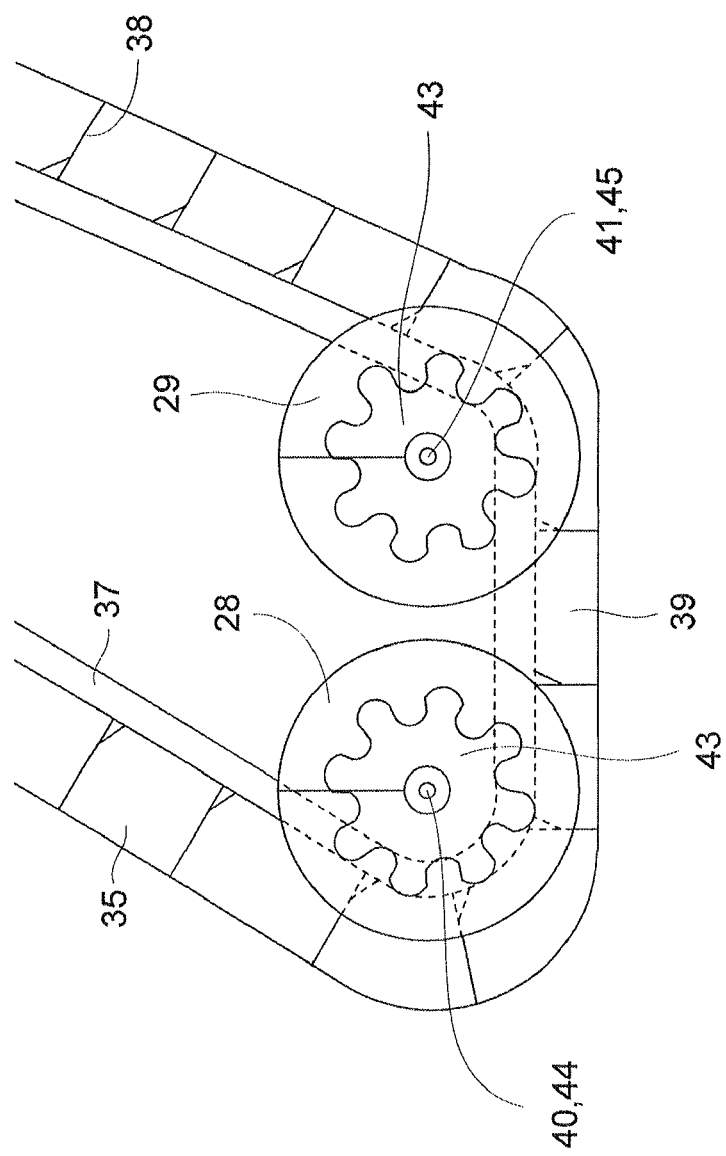

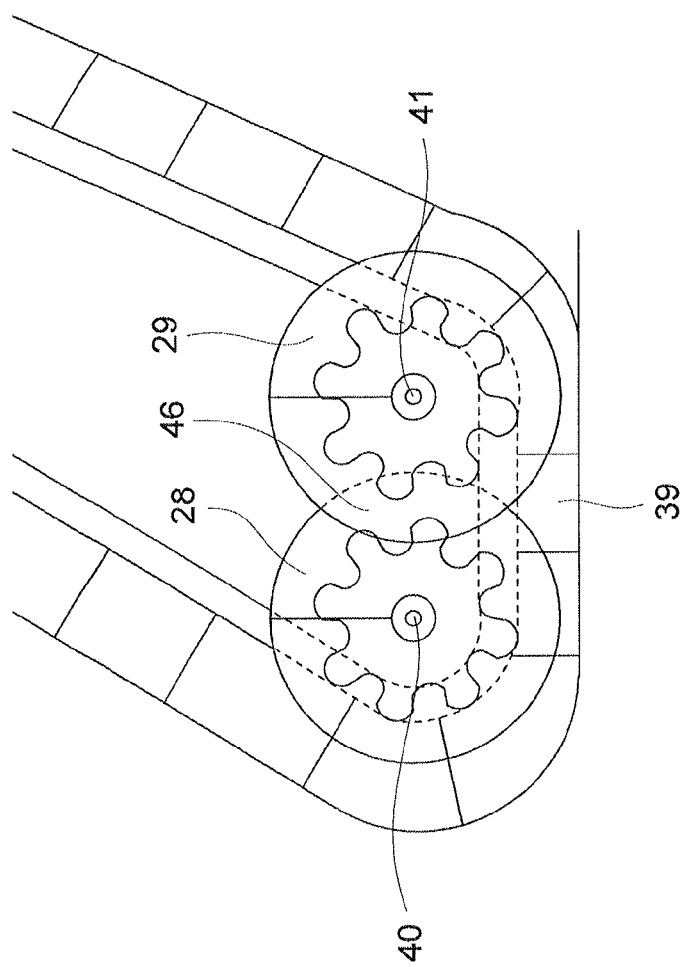

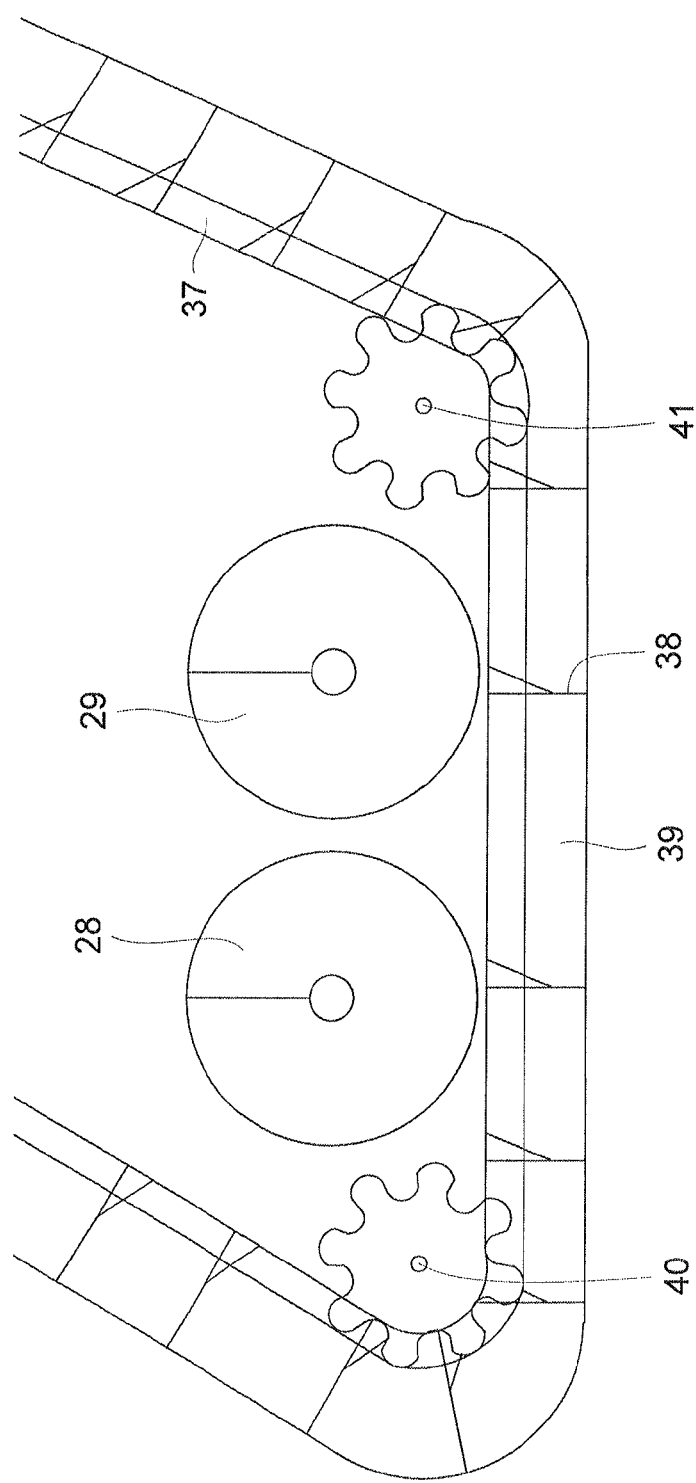

COMBINE HARVESTER CLEAN CROP ELEVATOR

CROSS-REFERENCE TO RELATED APPLICATION

The invention described and claimed hereinbelow is also described in German Patent Application DE 10 2008 014 001.5 filed on Mar. 13, 2008. This German Patent Application, whose subject matter is incorporated here by reference, provides the basis for a claim of priority of invention under 35 U.S.C. 119(a)-(d).

BACKGROUND OF THE INVENTION

The present invention relates to a combine harvester.

Publication U.S. Pat. No. 6,350,197 B1 makes known a combine harvester for harvesting agricultural crop material such as grain, corn, beans, or even grass seed, in which the crop material that has been harvested using a header is separated into different material flows using a plurality of working units located inside the combine harvester. A cleaning device is located in a region of the combine harvester that is close to the ground; the cleaning device further subdivides the grains and admixtures such as chaff or ear components which were separated using a threshing device and a separating device. For this purpose, the cleaning device includes two sieves which are situated horizontally one above the other, and which include adjustable sieve lamella and a cleaning fan. Only separated grains and smaller admixtures fall through the sieves which move in an oscillating manner. Larger and, in particular, lighterweight admixtures are conveyed out of the combine harvester via the flow that is created by the cleaning fan.

A quantity of crop material that has not fallen through the lower sieve, which is referred to as the "tailings", is forced out of the sieve at its rear end via the motion, and it falls due to its weight into an auger sump in which a conveyor auger is situated which is oriented transversely to the longitudinal extension of the combine harvester. This conveyor auger conveys the crop material toward one longitudinal side of the combine harvester and transfers it to an elevator in which the crop material is conveyed via conveyor plates situated on a circulating chain to the threshing mechanism which is situated in a higher region of the combine harvester, so that it may be returned to the threshing process. The grains that pass through the lower sieve, and which contain the fewest admixtures possible, fall due to their weight into a further auger sump in which a further conveyor auger is situated which extends transversely to the longitudinal extension of the combine harvester. This conveyor auger conveys the crop material toward one longitudinal side of the combine harvester and transfers it to an elevator in which the crop material is conveyed via conveyor plates situated on a circulating chain to the crop-material storage device which is situated in a higher region of the combine harvester, in order to store it for the interim.

To improve the transfer of the crop material from the particular conveyor auger to the particular elevator, it is provided in U.S. Pat. No. 6,350,197 B1 that the rotational axis of the conveyor auger and the lower deflection axle for the circulating chain of the elevator are situated such that they are offset relative to one another. As a result, the conveyor auger conveys the crop material into a transfer element which corresponds to the intake region of the elevator, and which is approximately conical in shape, one lateral surface of which is open toward the intake region of the elevator. The purpose of this is to ensure that the conveyor plates of the elevator are filled more evenly. Since, however, the quantity of crop material to be conveyed is essentially not limited by the distribution of the crop material onto the conveyor plates of the elevator, but rather is limited by the cross section in the side panel of the combine harvester in the region of the intake region of the elevator, it is not possible to increase the conveying performance of the conveyor device using a design as described in U.S. Pat. No. 6,350,197 B1.

A further disadvantage of the combine harvester known from U.S. Pat. No. 6,350,197 B1 is that, due to the conical design of the transfer element, crop material becomes jammed, in particular when it is moist, since it is not possible to actively convey the crop material into the elevator, and, instead, it is merely pressed into the elevator by crop material that arrives subsequently.

SUMMARY OF THE INVENTION

Accordingly, it is an object of the present invention to provide a combine harvester which avoids the disadvantages of the prior art.

More particularly, it is an object of the present invention to provide a combine harvester in which the conveying performance of the conveyer device is increased.

In keeping with these objects and with others which shall become apparent hereinafter, one feature of the present invention resides, briefly stated, in a combine harvester, comprising at least one cleaning device including at least one sieve and one cleaning fan; at least one conveyor device for conveying at least a portion of the crop material that exits said cleaning device into a higher region of the combine harvester, said conveyor device including at least one elevator having a lower intake region and an upper transfer region, so that the crop material is conveyed in said elevator via conveyor plates which are situated on a circulating chain, wherein said elevator includes, in its lower region, at least two interspaced deflection axles for said circulating chain, which are oriented transversely to the longitudinal extension of the combine harvester.

Given that the elevator includes, in its lower region, at least two interspaced deflection axles for the circulating chain, which are oriented transversely to the longitudinal extension of the combine harvester, the space available for the expansion of the intake region of the elevator is increased in such a manner that a large quantity of crop material may be captured by the conveyor plates of the elevator without disruption. The conveyor device may be designed as a "tailings conveyor device", or as a conveyor device for crop material grains.

Advantageously, the intake region of the elevator is situated between the deflection axles so that a large quantity of crop material may be conveyed into the elevator, and so that the elevator may pick up the crop material via the conveyor plates and convey it. A further advantage of a system of this type is that the individual conveyor plates are filled completely, thereby maximizing the quantity of crop material that is conveyed by the individual conveyor plates.

In an advantageous development of the present invention, the deflection axles lie approximately on a horizontal plane, thereby ensuring that the conveyor plates of the elevator are filled well and evenly across their entire width.

In an advantageous development of the present invention, the conveyor device also includes at least one conveyor auger which is oriented transversely to the longitudinal extension of the combine harvester, and which conveys the crop material into the intake region of the elevator, thereby ensuring that a large quantity of crop material is conveyed into the elevator without disruption.

In an advantageous development of the present invention, a good, disruption-free transfer of crop material from the at least one conveyor auger into the elevator is attained by the fact that the distance between the two deflection axles corresponds at the least to the radius of the at least one conveyor auger.

In order to ensure that the conveyor plates of the elevator are filled well and evenly, in an advantageous development of the present invention, one transfer end of the at least one conveyor auger terminates in the intake region above the chain of the elevator.

In order to act on the intake region of the elevator—which has been widened in a manner according to the present invention—using a large quantity of crop material, which is the object of the present invention, the conveyor device according to an advantageous development of the present invention includes at least two axially parallel conveyor augers. These two conveyor augers make it possible to convey a larger quantity of crop material out of the cleaning device and into the elevator. In addition, the diameter of the conveyor augers may be reduced despite their increased conveying performance, which is advantageous for the bearings and drives since smaller masses are involved.

In an advantageous development of the present invention, the installation space required inside the combine harvester for the conveyor device is reduced by the fact that the rotational axis of a conveyor auger extends in overlap with a deflection axle. A design of this type offers the further advantage that the elevator chain and the conveyor auger may share the same drive.

In an advantageous development of the present invention, the installation space required inside the combine harvester is further reduced by the fact that the rotational axes of both conveyor augers extends in overlap with the deflection axles. A design of this type offers the further advantage that the elevator chain and the conveyor augers may share the same drive.

In an advantageous development of the present invention, the conveyor augers have different diameters, thereby making it possible to further minimize the installation space required below the sieve of the cleaning device.

To minimize the drive output required for the conveyor device, it is provided in an advantageous development of the present invention that the conveyor augers may be operated independently of one another, thereby making it possible, e.g. to operate only one conveyor auger in the regular case, and to operate an additional conveyor auger only when there is a greater quantity of crop material.

To ensure that crop material is conveyed in a homogeneous manner nevertheless, in particular when the conveyor augers have different diameters, it is provided in an advantageous development of the present invention that the conveyor augers may be operated at different rotational drive speeds.

Since the heaped cone of crop material that forms above the conveyor augers may be influenced by intentionally selecting a certain rotational drive direction of the conveyor augers, it is provided in an advantageous development of the present invention that the conveyor augers may rotate in the same direction or in opposite directions. If both of the conveyor augers rotate in the clockwise direction, the heaped cone will shift to the right, as viewed in the direction of conveyance. If both of the conveyor augers rotate in the counterclockwise direction, the heaped cone will shift to the left, as viewed in the direction of conveyance. If the conveyor augers rotate in opposite directions, the heaped cone will form between the conveyor augers if one conveyor auger that is located on the right as viewed in the conveyance direction rotates in the counterclockwise direction, and the conveyor auger that is located to the left of the first conveyor auger is rotated in the clockwise direction.

If one conveyor auger that is located on the right as viewed in the conveyance direction rotates in the clockwise direction, and the conveyor auger that is located to the left of the first conveyor auger is rotated in the counterclockwise direction, the heaped cone will widen and therefore flatten out. To attain a driving rotational direction in the clockwise direction, the turns of a conveyor auger must wind toward the left, while, in order to attain a driving rotational direction in the counterclockwise direction, the turns of a conveyor auger must wind toward the right. Depending on the amount of installation space available underneath the cleaning device in the particular combine harvester, it is therefore advantageously possible to select conveyor augers in a targeted manner.

The present invention is explained in greater detail below with reference to the attached drawing.

BRIEF DESCRIPTION OF THE DRAWINGS

FIGS. 4a through 4d: show schematic views of detail Y in FIG. 3, in four possible embodiments of the combine harvester in accordance with the present invention.

DESCRIPTION OF THE PREFERRED EMBODIMENTS

Figure 1:
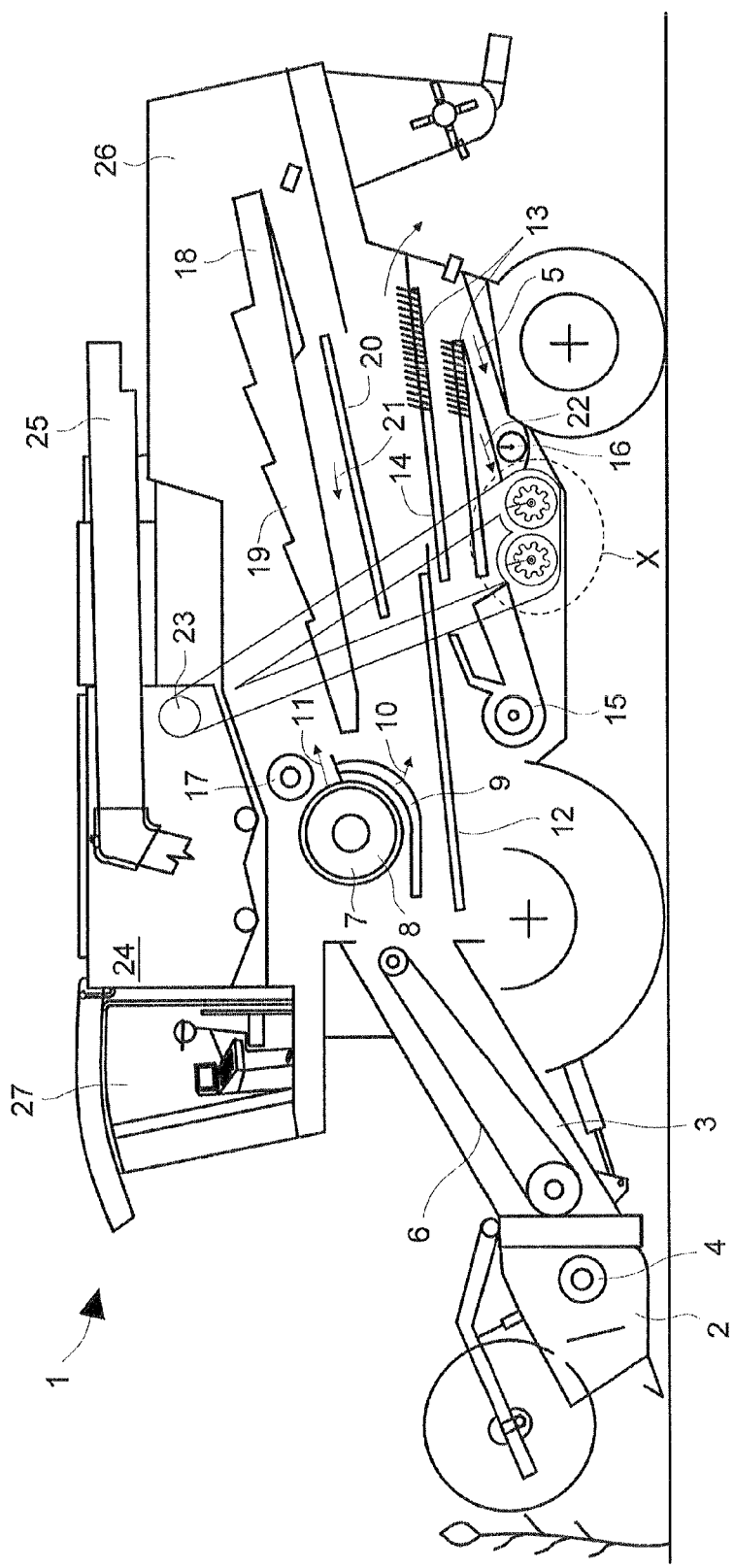
FIG. 1 shows a schematic side view of a combine harvester in accordance with the present invention from the left.

Combine harvester 1 shown schematically in FIG. 1 is composed of a support frame which is connected to the ground drive, and on which a multiple-component machine housing 26 is mounted. To protect the driver of combine harvester 1 from disturbing environmental influences, a closed driver's cab 27 is located in the front region. Combine harvester 1 includes a grain-cutting device 2 which is connected in a manner known per se to feed rake 3 of combine harvester 1. Cross auger component 4 of header 2 transfers the crop material to feed rake 3 which transfers the crop material via circulating conveyor 6 in its upper, rear region to threshing mechanism 7 of combine harvester 1. In threshing mechanism 7, which may be designed to include one cylinder or several cylinders, the crop material is conveyed between cylinders 8 and a concave 9 which at least partially encloses cylinders 8, thereby separating it into at least two sub-streams 10, 11. First sub-stream 10 is composed essentially of grain, short straw, and chaff, and it is conveyed directly via a grain pan 12 to a cleaning device 14 which is composed of various sieve levels 13. Cleaning device 14 also includes a cleaning fan 15 which generates a stream of air which passes through sieve levels 13.

Further sub-stream 11 which is composed essentially of straw and a residual portion of grain, and which exits threshing mechanism 7 in its rear region, is directed via a straw guide cylinder 17 to a separating device 19 designed as a tray-type shaker 18. Via the motion of tray-type shaker 18, a large portion of grains 21 contained in the straw layer is separated on tray-type shaker 18, and it is transferred via a return pan 20 and grain pan 12 to cleaning device 14.

Finally, in cleaning device 14, a cleaned grain flow 22 obtained from various crop-material flows 10, 21 that are directed into cleaning device 14 is conveyed via a conveyor device 23—which will be described in greater detail, below—into a grain tank 24, where it is stored for the interim. Grain tank 24 is usually emptied using a grain tank unloading conveyor 25.

The mass flow that also exits cleaning device 14 and is referred to as tailings material flow 5 is composed of parts of the crop material that are heavier than the chaff and heavier than grains 21, 22 themselves, which prevents them from being blown out of the sieve pan by cleaning fan 15. This crop material consists of non-threshed ears or grains that were not sufficiently shelled, and must therefore be threshed once more. Tailings material flow 5 also contains individual grains. Tailings material flow 5 is returned to threshing mechanism 7 via a conveyor device 16 which is not shown in greater detail.

Figure 2:
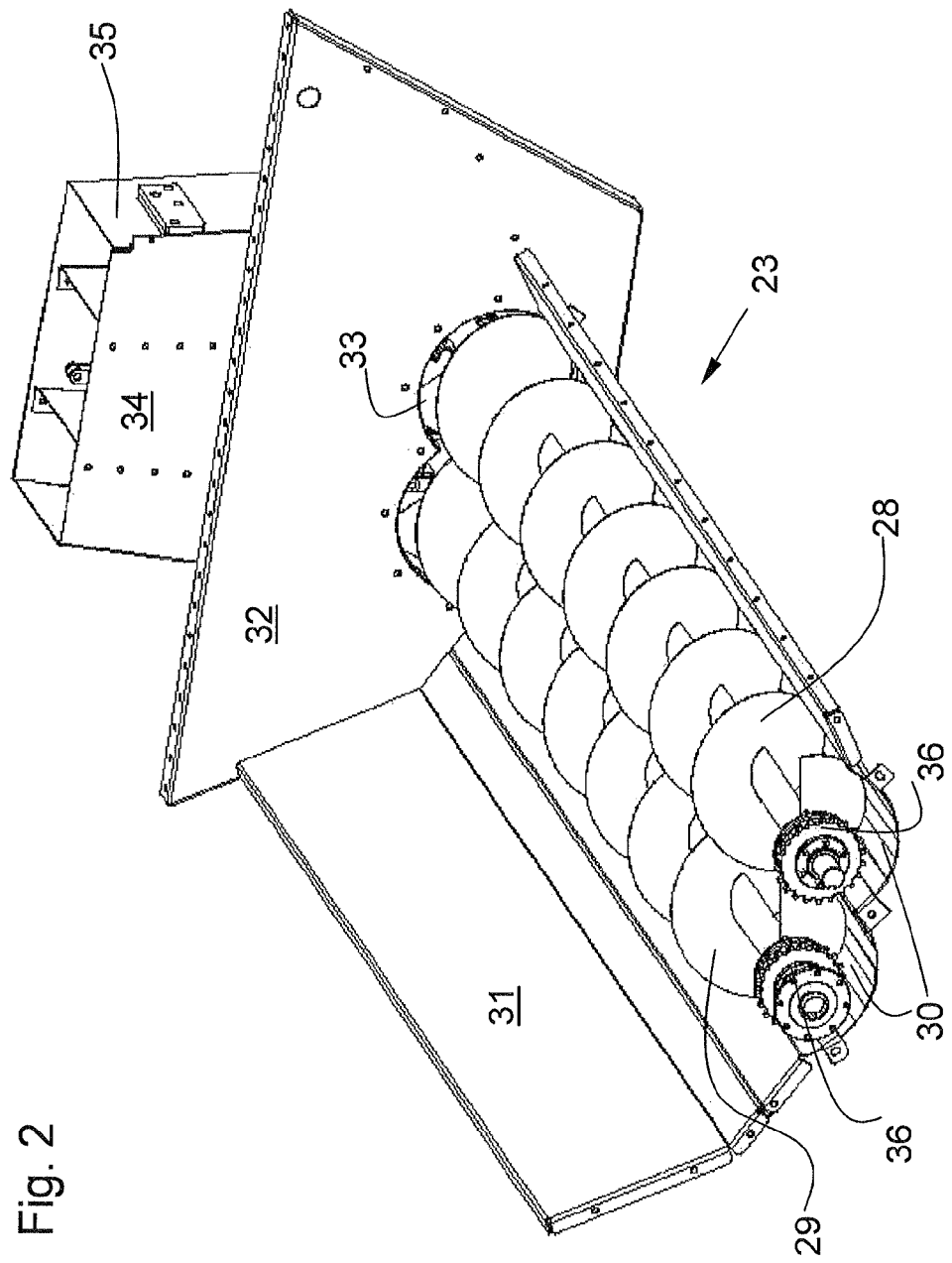
FIG. 2 shows a perspective top view of detail X in FIG. 1 of the combine harvester in accordance with the present invention.

FIG. 2 shows conveyor device 23 which is labeled as detail X in FIG. 1, in an enlarged perspective view. The flow of grain that was cleaned in the cleaning device slides under its own weight across base 31 which limits conveyor device 23, and into auger sump 30. In auger sump 30, two conveyor augers 28, 29 which are oriented transversely to the longitudinal extension of the combine harvester are situated parallel to one another. Conveyor augers 28, 29, the turns of which wind toward the right, are driven in the counterclockwise direction using a not-shown drive unit via gear wheels 36 which are situated on conveyor augers 28, 29. The rotational motion of conveyor augers 28, 29 conveys the flow of grain into an intake region of elevator 35, through an opening 33 in a side panel 32 formed in the right-hand longitudinal side of the combine harvester, and through a related opening in an elevator housing 34 of an elevator 35 which is situated on the longitudinal side of the combine harvester. Elevator 35 then conveys the crop material into the grain tank of the combine harvester.

Figure 3:
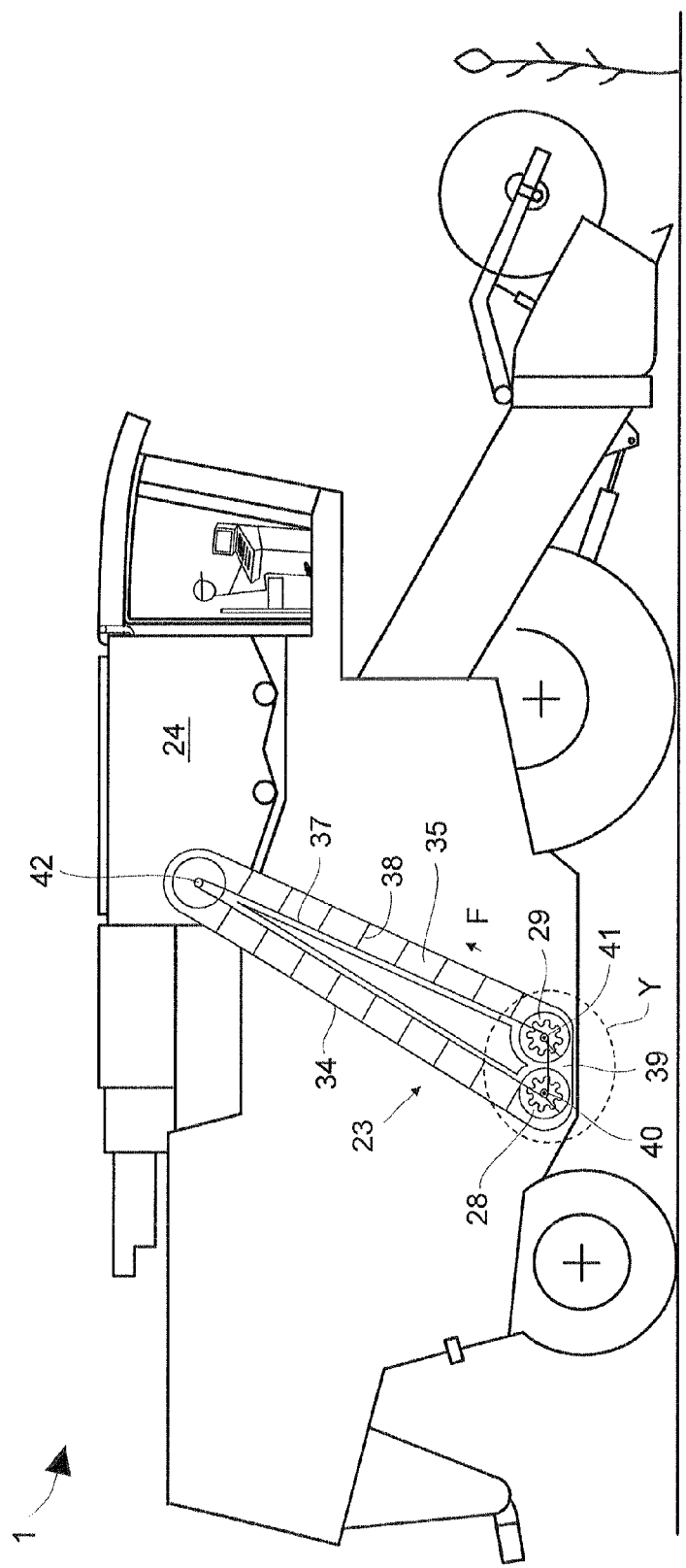
FIG. 3 shows a schematic side view of a combine harvester in accordance with the present invention from the right.

FIG. 3 shows the right-hand side of combine harvester shown in FIG. 1, in a schematic view. The crop material flow that is conveyed via conveyor augers 28, 29 of conveyor device 23 into intake region 39 of elevator 35 is captured by conveyor plates 38 which are situated on a circulating chain 37, which convey it in conveyance direction F into grain tank 24. For this purpose, elevator 35 includes an upper deflection axle 42 for circulating chain 37, and two lower, interspaced deflection axles 40, 41 which are oriented transversely to the longitudinal extension of combine harvester 1. The distance between the two lower deflection axles 40, 41 results in a large spacial expansion of the transfer region of conveyor augers 28, 29 and intake region 39 of elevator 35, thereby enabling a large quantity of crop material to be conveyed into grain tank 24 without disruption using conveyor device 23. The wide distance between the two lower deflection axles 40, 41 for chain 37 of elevator 35 also results in the advantage that a larger quantity of crop material in intake region 39 may also slide up to the wall of elevator housing 34 opposite conveyor augers 28, 29 before it is captured by conveyor plates 38, thereby ensuring that individual conveyor plates 38 are filled more evenly and with a larger quantity of crop material.

FIG. 4a shows detail Y in FIG. 3 in an enlarged, simplified depiction. Rotational axles 44, 45 of conveyor augers 28, 29 extend such that they overlap lower deflection axles 40, 41 for chain 37 of elevator 35. Rotatable gear wheels 43 which are used to redirect chain 37 are situated on deflection axles 40, 41. Due to the distance between deflection axles 40, 41, which is approximately greater than twice the radius of one conveyor auger 28, a wide intake region 39 in elevator 35 results, in which individual conveyor plates 38 may receive the crop material that has been conveyed into intake region 39 using conveyor augers 28, 29.

FIG. 4b shows a second embodiment of the detail shown in FIG. 4a. To prevent repetition, only the differences from the embodiment depicted in FIG. 4a will be described. In this case, the distance between deflection axles 40, 41 is only slightly greater than the radius of one conveyor auger 28. Since two parallel conveyor augers 28, 29 are situated in the conveyor device, they must be designed such that the auger turns mesh with one another, as viewed in the conveyance direction. This results in an overlap region 46 in which the crop material may be conveyed by conveyor auger 28 and by conveyor auger 29. Due to the smaller distance between deflection axles 40, 41, intake region 39 of the elevator is somewhat narrower than it is in the embodiment depicted in FIG. 4a, but this also means that less installation space is required for the embodiment shown in FIG. 4b.

FIG. 4c shows a further embodiment of the detail shown in FIG. 4a. To prevent repetition, only the differences from the embodiment depicted in FIG. 4a will be described. In this embodiment, the distance between deflection axles 40, 41 is selected to be so great that a very wide intake region 39 of the elevator results. Conveyor augers 28, 29 are situated between deflection axles 40, 41 and on a horizontal plane above chain 37. As a result, it is possible to design the turns of conveyor augers 28, 29 in intake region 39 to extend above chain 37, thereby enabling the crop material to be actively conveyed up to that point. A design of this type ensures that conveyor plates 38 are filled completely and evenly.

Figure 4D:
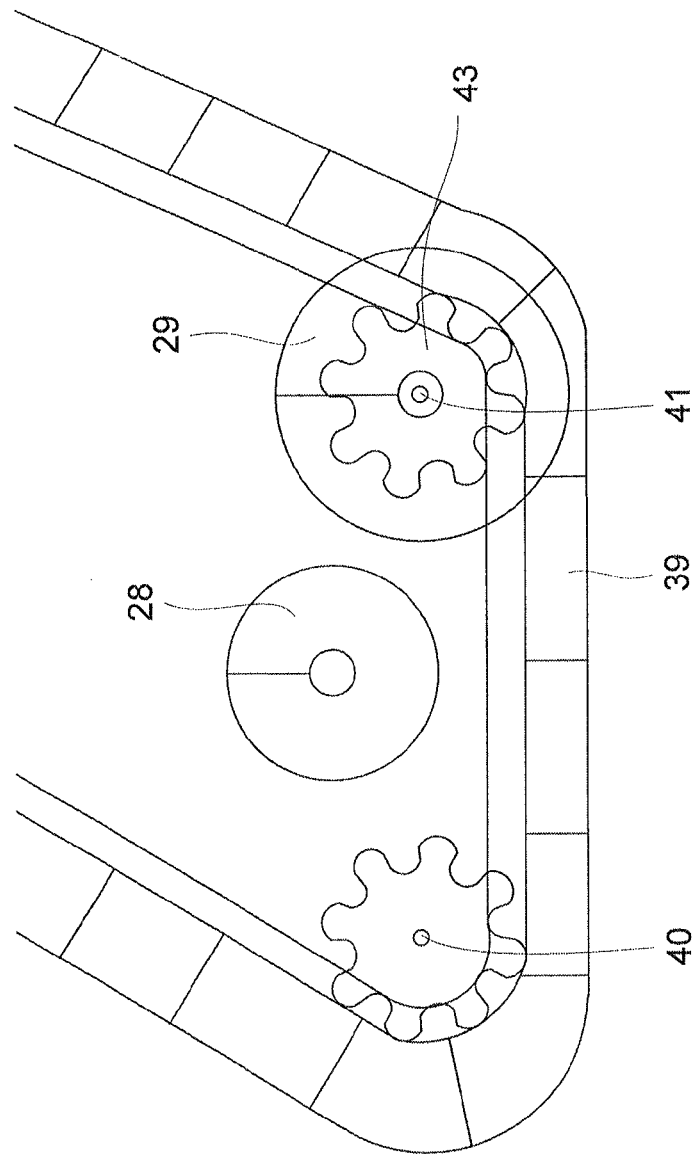

FIG. 4d shows a further embodiment of the detail shown in FIG. 4a. To prevent repetition, only the differences from the embodiment depicted in FIG. 4a will be described. In this embodiment, only conveyor auger 29 is situated such that its rotational axis 43 overlaps with a deflection axle 41 of the elevator. A second conveyor auger 28 which has a smaller diameter is situated parallel to first conveyor auger 29 between deflection axles 40, 41 above intake region 39. In the embodiment shown in FIG. 4d, it would be possible, for example, to regularly operate only conveyor auger 29 in order to convey the crop material into intake region 39 of the elevator. Second conveyor auger 28 is operated in order to increase the volume of material conveyed only when the crop material throughput rate is higher, which also results in a larger quantity of crop material exiting the cleaning device. It is therefore possible to lower the amount of drive energy required by the conveyor device.

The aforementioned features of conveyor device 23 may also be used, after having been adapted accordingly, for conveyor device 16 which conveys tailings material flow 5.

It will be understood that each of the elements described above, or two or more together, may also find a useful application in other types of constructions differing from the types described above.

While the invention has been illustrated and described as embodied in a combine harvester, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A combine harvester, comprising at least one cleaning device including at least one sieve and one cleaning fan; at least one conveyor device for conveying at least a portion of a crop material that exits said cleaning device into a higher region of the combine harvester, said conveyor device including at least one elevator having a lower intake region and an upper transfer region, so that the crop material is conveyed in said elevator via conveyor plates which are situated on a circulating chain, wherein said elevator includes, in its lower region, at least two interspaced deflection axles for said circulating chain, which are oriented transversely to a longitudinal extension of the combine harvester, wherein said conveyor device also includes at least one conveyor auger which is oriented transversely to the longitudinal extension of the combine harvester, and which conveys the crop material into said lower intake region of said elevator, and wherein the rotational axis of the at least one conveyor auger is located between the deflection axles.

2. The combine harvester as defined in claim 1, wherein said lower intake region of said elevator is situated between said deflection axles.

3. The combine harvester as defined in claim 1, wherein said deflection axles are located substantially on a horizontal plane.

4. The combine harvester as defined in claim 1, wherein said deflection axles are arranged so that a distance between said two deflection axles corresponds at least to a radius of said at least one conveyor auger.

5. The combine harvester as defined in claim 1, wherein said at least one conveyor auger has a transfer end which terminates in said lower intake region above said chain of said elevator.

6. The combine harvester as defined in claim 1, wherein said conveyor device includes at least two conveyor augers which are situated axially parallel to one another.

7. The combine harvester as defined in claim 6, wherein one of said conveyor augers has a rotational axis which extends in overlap with one deflection axle.

8. The combine harvester as defined in claim 7, wherein said conveyor augers have rotational axes which extend in overlap with two deflection axles.

9. The combine harvester as defined in claim 6, wherein said conveyor augers of said conveyor device have different diameters.

10. The combine harvester as defined in claim 6, wherein said conveyor augers of said conveyor device are operatable independently of one another.

11. The combine harvester as defined in claim 6, wherein said conveyor augers of said conveyor device are operatable at different rotational drive speeds.

12. The combine harvester as defined in claim 6, wherein said conveyor augers of said conveyor device have driving rotational directions that rotate in a way selected from the group consisting of in a same direction and in opposite directions.

* * * * *